United States Patent
Zhu et al.

(10) Patent No.: US 11,361,003 B2
(45) Date of Patent: Jun. 14, 2022

(54) DATA CLUSTERING AND VISUALIZATION WITH DETERMINED GROUP NUMBER

(71) Applicant: salesforce.com, inc., San Francisco, CA (US)

(72) Inventors: Guangyu Zhu, San Jose, CA (US); Robin Glinton, San Francisco, CA (US)

(73) Assignee: salesforcecom, inc., San Francisco, CA (US)

( * ) Notice: Subject to any disclaimer, the term of this patent is extended or adjusted under 35 U.S.C. 154(b) by 1231 days.

(21) Appl. No.: 15/334,993

(22) Filed: Oct. 26, 2016

(65) Prior Publication Data

US 2018/0113929 A1    Apr. 26, 2018

(51) Int. Cl.
*G06F 16/28* (2019.01)

(52) U.S. Cl.
CPC .......... *G06F 16/287* (2019.01); *G06F 16/283* (2019.01)

(58) Field of Classification Search
CPC .. G06F 16/287; G06F 16/283; G06F 11/3404; G06F 17/30445
USPC ......................................................... 707/740
See application file for complete search history.

(56) References Cited

U.S. PATENT DOCUMENTS

| | | | | |
|---|---|---|---|---|
| 6,212,524 B1* | 4/2001 | Weissman | ............. | G06F 16/283 707/600 |
| 6,665,682 B1* | 12/2003 | DeKimpe | ............. | G06F 16/283 |
| 6,728,724 B1* | 4/2004 | Megiddo | ............. | G06F 16/283 |
| 8,082,322 B1* | 12/2011 | Pascarella | ............... | G06F 9/541 709/218 |
| 8,306,982 B2* | 11/2012 | Audet | ..................... | G06F 16/93 707/737 |
| 8,443,367 B1* | 5/2013 | Taylor | ..................... | G06F 9/52 718/102 |
| 8,799,181 B2* | 8/2014 | Moore | ................... | G06Q 10/10 705/348 |
| 8,812,544 B2* | 8/2014 | Engelhardt | ............ | G06Q 10/00 707/778 |
| 8,819,643 B1* | 8/2014 | Ellis | .................... | G06F 11/3419 717/131 |
| 8,825,713 B2* | 9/2014 | Guizar | ..................... | G06F 16/25 707/803 |
| 9,015,812 B2* | 4/2015 | Plattner | ................... | H04L 63/06 726/4 |

(Continued)

OTHER PUBLICATIONS

Foti, D., et al. "Scalable parallel clustering for data mining on multicomputers," International Parallel and Distributed Processing Symposium, Springer Berlin Heidelberg, 2000, 9 pages.

(Continued)

*Primary Examiner* — Hanh B Thai
(74) *Attorney, Agent, or Firm* — Kowert, Hood, Munyon, Rankin & Goetzel, P.C.; Lawrence J. Merkel

(57) ABSTRACT

This disclosure provides various techniques that may allow for clustering a set of data objects and creating a visualization of the clustered data. For example, a user may desire to cluster data objects in a dataset to form meaningful groupings of the data objects. This disclosure provides, in one example of data object clustering and visualization, that a plurality of groupings of the data objects may be determined in parallel. These groupings may be evaluated and a particular grouping selected based on the evaluating. Data useable to visualize the particular grouping may be generated.

15 Claims, 6 Drawing Sheets

(56) References Cited

U.S. PATENT DOCUMENTS

| | | | |
|---|---|---|---|
| 9,286,678 B2 * | 3/2016 | Zhu | G06T 7/80 |
| 9,383,424 B2 * | 7/2016 | Gulaka | G06T 7/0012 |
| 9,483,843 B2 * | 11/2016 | Capens | G06T 1/60 |
| 9,886,474 B2 * | 2/2018 | De Smet | G06F 16/283 |
| 9,996,638 B1 * | 6/2018 | Holz | G06F 3/017 |
| 10,019,143 B1 * | 7/2018 | Haitani | G06F 3/0482 |
| 10,507,544 B2 * | 12/2019 | Zhang | B23K 26/0608 |
| 10,720,968 B2 * | 7/2020 | Schmidt | H04B 7/022 |
| 2003/0204499 A1 * | 10/2003 | Shahabi | G06F 16/2462 |
| 2005/0131924 A1 * | 6/2005 | Jones | G06F 16/283 |
| 2005/0262108 A1 * | 11/2005 | Gupta | G06F 16/2358 |
| 2006/0271568 A1 * | 11/2006 | Balkir | G06Q 10/10 |
| 2007/0022093 A1 * | 1/2007 | Wyatt | G06F 16/283 |
| 2007/0203902 A1 * | 8/2007 | Bauerle | G06F 16/40 |
| 2007/0233644 A1 * | 10/2007 | Bakalash | G06F 16/24556 |
| 2008/0294686 A1 * | 11/2008 | Long | G06K 9/6224 |
| 2009/0282369 A1 * | 11/2009 | Jones | G06F 16/26 715/848 |
| 2009/0307248 A1 * | 12/2009 | Moser | G16B 40/00 |
| 2010/0125604 A1 * | 5/2010 | Martinez | G06F 16/9535 707/784 |
| 2010/0223276 A1 * | 9/2010 | Al-Shameri | G06K 9/0063 707/769 |
| 2010/0312769 A1 * | 12/2010 | Bailey | G06F 16/35 707/740 |
| 2011/0231376 A1 * | 9/2011 | Oya | H04N 19/436 707/693 |
| 2011/0246409 A1 * | 10/2011 | Mitra | G06K 9/6228 702/179 |
| 2012/0054184 A1 * | 3/2012 | Masud | G06F 16/285 707/E17.091 |
| 2012/0158699 A1 * | 6/2012 | Creel | G06F 16/972 707/722 |
| 2013/0124484 A1 * | 5/2013 | Hoffman | G06F 16/254 707/688 |
| 2013/0173632 A1 * | 7/2013 | Birdwell | G06F 16/24578 707/743 |
| 2013/0230221 A1 * | 9/2013 | Bolstad | G06T 7/0012 382/128 |
| 2013/0238664 A1 * | 9/2013 | Hsu | G06F 16/283 707/797 |
| 2013/0275364 A1 * | 10/2013 | Wang | G06F 16/283 707/602 |
| 2014/0282429 A1 * | 9/2014 | Archer | G06F 16/283 717/130 |
| 2014/0330827 A1 * | 11/2014 | Wu | G06F 16/285 707/737 |
| 2015/0055085 A1 * | 2/2015 | Fonte | H04N 5/23219 351/178 |
| 2015/0081619 A1 * | 3/2015 | Brown | G06F 16/254 707/602 |
| 2015/0106142 A1 * | 4/2015 | Ristock | G06Q 10/06311 705/7.12 |
| 2015/0120822 A1 * | 4/2015 | Li | H04L 67/10 709/203 |
| 2015/0150012 A1 * | 5/2015 | Shazly | G06F 9/5083 718/102 |
| 2015/0370881 A1 * | 12/2015 | Kalki | G06F 16/283 707/600 |
| 2016/0339638 A1 * | 11/2016 | Fromm | B29C 64/209 |
| 2016/0342856 A1 * | 11/2016 | Krenzer | G06T 7/337 |
| 2017/0032222 A1 * | 2/2017 | Sharma | G06K 9/4619 |
| 2017/0293674 A1 * | 10/2017 | De La Riviere | G06Q 10/06 |

OTHER PUBLICATIONS

P.S. Bradley, et al., "Scaling Clustering Algorithms to Large Databases," Scaling Clustering Algorithms to Large Databases, KDD-98 Proceedings, 1998, AAAI, pp. 1-7.

* cited by examiner

FIG. 3

```
Set min_cost as a large number;
Repeat q times
    Create S by drawing s objects randomly from the entire data set D;
    Generate the set of medoids M from S by applying k-medoids clustering algorithm;
    Form the clustering set C by assigning each object in D to the closest medoid in M;
    if Cost(M,D) < min_cost
    Then
        min_cost = Cost (M,D);
        best_medoids = M;
        best_set = C;
    End-IF
End-Repeat
Return (best_set, best_medoids)
```

DATA CLUSTERING AND VISUALIZATION WITH DETERMINED GROUP NUMBER

BACKGROUND

Technical Field

This disclosure relates to the data clustering, and more particularly to determining a group number and visualization of clustered data.

Description of the Related Art

Currently, when data is clustered, assumptions must be made regarding the number of groups within the data. The data can have a large number of characteristics, and which characteristics are useful for separating the data is often not known in advance. The required assumption regarding the number of groups may thus lead to a less useful grouping of the data objects. Furthermore, the data objects may exist in high dimensional space, making visualization of the data objects a challenge for humans using the clustering result.

BRIEF DESCRIPTION OF THE DRAWINGS

FIG. 3 shows an example of a clustering algorithm, according to some embodiments.

DETAILED DESCRIPTION

Large data sets with many potential characteristics that may be used to group members of the set have an ambiguous choice as to the number of groups to be detected in the data. An incorrect selection may often result in poor grouping, defeating the end goal of using the grouped data for a given user's goals. That is, data objects in a given group from the data set are to have more similarities to each other than to members of other groups. A poor selection of the number of groups to detect may lead to less differentiation among the groups (too small of a group number) or too much differentiation (too large of a group number). In this disclosure, a mechanism is described to perform multiple clustering attempts on a data set using different group numbers for each attempt. The clustering attempts may be run in parallel on multiple cores in a multi-core server. The resulting clusters may be evaluated to determine which group number provided a good result, and the result may be visualized for the user.

It should be noted that various elements of this disclosure that are shown in the figures or described in the text may be used in conjunction with any of the computer systems, servers, mobile devices, other apparatuses, elements, or components disclosed herein or known in the art, among other systems. In various embodiments, some of the elements of process flows shown may be performed concurrently instead of sequentially, or in a different order than shown, or may even be omitted altogether in some cases. Additional process flow elements that are not shown may also be performed as appropriate or desired. In some embodiments, different elements of process flows may be performed by the same system or different systems.

One of ordinary skill in the art with the benefit of this disclosure will understand that various types of database or other storage technologies may be used in accordance with this disclosure. One of ordinary skill in the art with the benefit of this disclosure will also understand that the teachings herein are applicable to various types of situations in which clustering data objects and creating a visualization of the clustered data objects is a goal, and need not be limited to any specific situation described herein.

Figure 1:
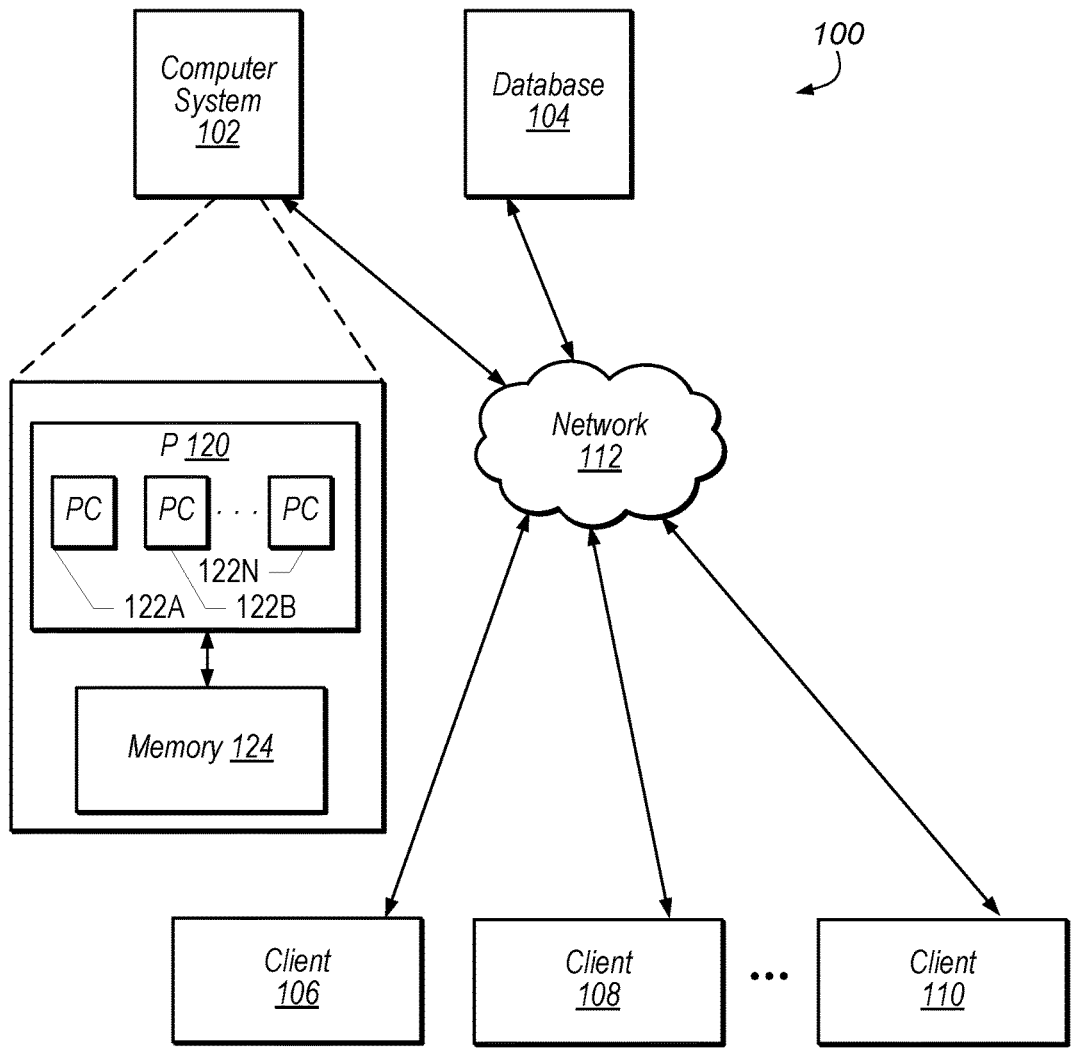
FIG. 1 is a block diagram illustrating an embodiment of this disclosure.

Turning now to FIG. 1, a block diagram of system 100 is shown. In system 100, computer system 102 is operable to run a clustering algorithm (e.g., to determine one or more groupings of data objects). Computer system 102 may include one or more physical machines. Network 112 may represent the Internet, an intranet, or any other suitable type of computer network. In some embodiments, computer system 102 may be a web server. In other embodiments, however, other types of computer systems are also contemplated. For example, computer system 102 may provide application-specific content to an application (e.g., a smart phone application or a computer application). In other embodiments, still other types of content may be provided, as appropriate. In general, computer system 102 typically provides textual content, graphical content, audio content, video content, executable code content, and/or binary content, etc. to one or more of clients 106, 108, and 110.

The computer system 102 is illustrated in more detail in exploded view in FIG. 1. In the illustrated embodiment, the computer system 102 may include one or more processors 120. Each processor 120 may be a multi-core processor including a plurality of cores (e.g. processor cores 122A-122N in FIG. 1). The processor cores 122A-122N may be capable of independently executing threads of a program (or threads from multiple programs) as assigned by an operating system, master control code, or other control software. The processor 120 may be coupled to a memory system 124 in FIG. 1. Other peripheral components (not shown in FIG. 1) may be included in the computer system 102 as well.

FIG. 1 also includes database server 104. In some embodiments, database server 104 may be embodied in the same physical system(s) as computer system 102, or database server 104 may be embodied in a different system or systems. Various types of data may be stored on database server 104, as discussed in more detail below. In some cases, clients 106, 108, and 110 may communicate directly with database server 104; in other cases, clients 106, 108, and 110 may communicate only with computer system 102, and computer system 102 may in turn communicate with database server 104. The communication between computer system 102 and database server 104 may be via the same network 112 as shown in FIG. 1, or via a different (e.g., an internal) network. In an embodiment, the database server 104 may store the data that is to be clustered using the clustering mechanism described herein.

The computer system 102 may be, in some embodiments, a cloud-based system providing software operation for users on clients 106, 108, and/or 110. For example, the computer system 102 may be part of a software as a service (SaaS) model. Alternatively, the computer system 102 may be directly operated by a user.

Figure 2:
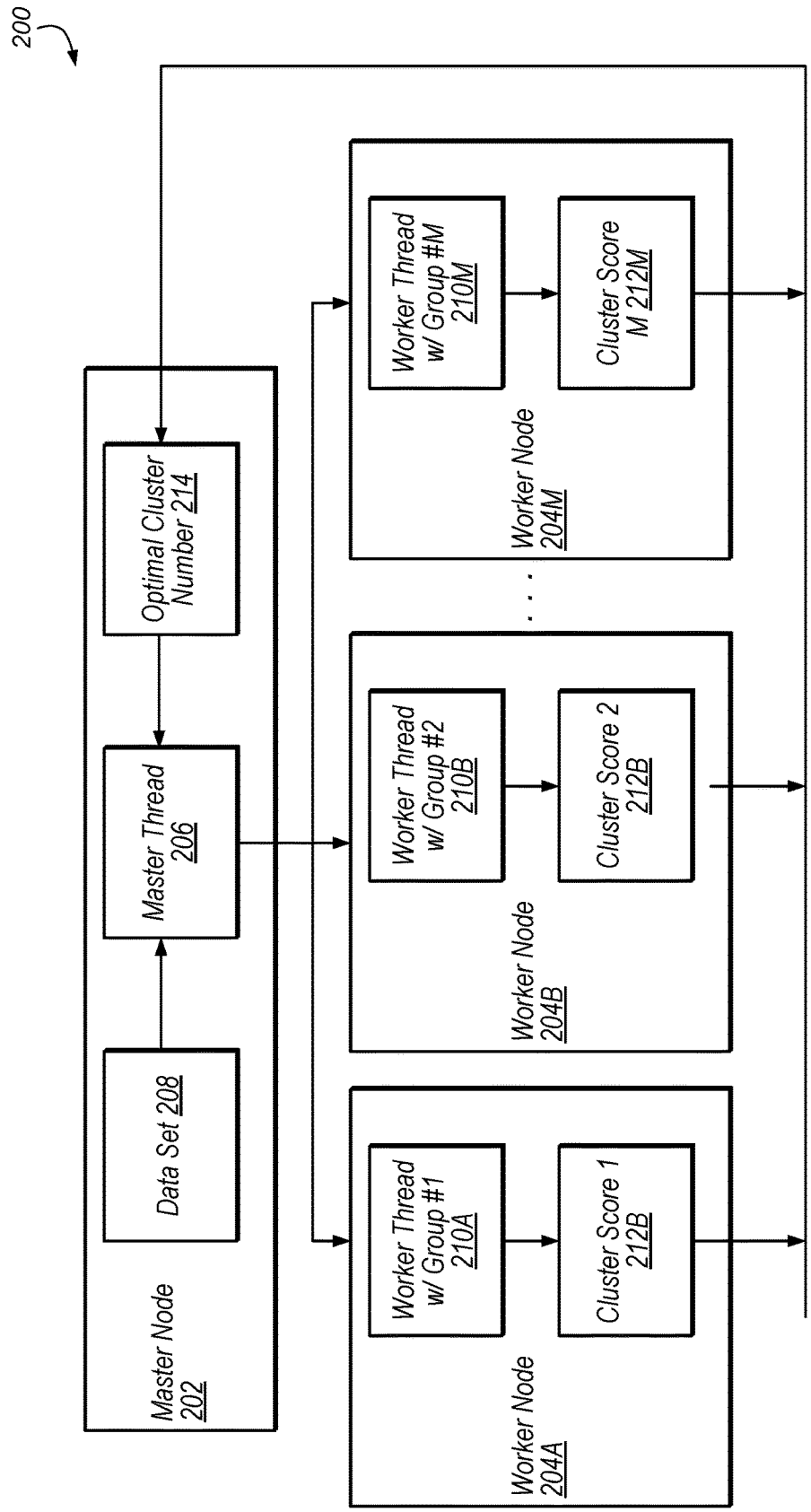
FIG. 2 shows an example of a computer system for multi-threaded computation of a data set, according to some embodiments.

Turning now to FIG. 2, an example of a computer system 200 for multi-threaded computation of a data set, according to some embodiments, is shown. For example, the computer system 102 may be used, in some embodiments. As illustrated in FIG. 2, there may be a master node 202 and a plurality of worker nodes 204A-204M. In an embodiment, each node 202 and 204A-204N may be a processor core 122A-122N in the processor 120.

The master node may execute a master thread 206 that controls the process of clustering a data set 208. The data set 208 may be accessed from the database 104, may be a local data structure on the computer system 102, or may be a local data structure populated from the database 104. Generally, the data set 208 may include a number of data objects, which may have a variety of characteristics associated with them. The data objects may be clustered according to a similarity of one or more of the characteristics, where similarity in the selected characteristics may indicate that the data objects exhibiting the similarity are closely related in some fashion. A data object may be an instance of data in the data set. A particular data object may not have all characteristics associated with it. That is, the data objects may or may not be fully populated with characteristics.

For example, the data objects may be customer data objects, where each customer data object may correspond to a different customer. The characteristics, in this case, may include one or more demographics related to the customer and/or one or more behaviors associated with the customer. Demographics may include one or more of age, nationality, gender, income level, geographic location, employer, position with employer, physical characteristics (e.g. height, weight, etc.), etc. Behaviors may include any observable actions that may be exhibited by a customer. For example, use or non-use of certain application software, and/or frequency of use, may be a behavior. Device used to access an application (e.g. smart phone, desktop, laptop, etc.) may be a behavior. Location of access (e.g. fixed or varying from access to access, access from home versus work office or other business site) may be a behavior. Day/time of access may be a behavior.

Customer data only one example of data set that may be clustered. Generally, any large data set may be used. For example, in DNA analysis, the data objects may be strands of DNA and characteristics may include strand length, presence of certain combinations of DNA components, presence of certain mutations and location of such mutations with a strand, etc. Clustering may be used for image analysis (e.g. pattern recognition between two images or a pattern arbitrarily located within an image), compression (grouping similar data objects to compress them, keeping the difference between a reference object and the similar objects), geological data (locating similar structures in a large formation to identify, e.g., likely pockets of oil, water, or other materials), etc. Generally, the characteristics of the data objects in various embodiments may include features/properties of the data objects and observable behaviors of the data objects.

Determining which characteristics to use for clustering, and how many groups to identify within the cluster, is not a simple a priori decision. The present mechanism may include the master thread 206 issuing the data set 208 to multiple worker threads 210A-210M, each having a different group number to use for clustering. A group number may be the number of groups to detect in the clustering algorithm. Thus, if there are n processor cores, and one processor core is executing the master thread 206, there may be n−1 processor cores executing worker threads 204A-204M, wherein n is an integer greater than one. The group numbers assigned to the threads may be 2 to n. Alternatively, other group numbers may be used based on the nature of the data. For example, the minimum group number may be larger than 2, and/or the interval from one group number to the next may be larger than 1.

Any clustering technique or techniques may be implemented in various embodiments of the work threads 210A-210M. For example, the clustering large applications (CLARA) algorithm may be used. Other clustering algorithms may include k-means or k-medoids, where k is the group number. In the k-means clustering algorithm, points may be clustered into groups by attempting to minimize the within-cluster sum of squares (the sum of the distance between each point in the set and the center of the cluster). The center of the cluster in the k-means algorithm need not be a point in the set, but rather may be a location that is the center of the points in the cluster. In the k-medoids clustering algorithm, points may be clustered into groups by attempting to minimize pair wise dissimilarities between points and a point that is selected as the center of the group. That is, the point that is the center (the medoid, or exemplar) is one of the points being clustered. Expectation maximization algorithms of various types may be used.

CLARA performs clustering on large volume data sets in high dimensions, relying on the sampling approach to handle the large data sets. That is, instead of finding medoids for the entire data set, CLARA draws a sample from the data set and applies the medoids k (where k is the group number) algorithm to generate an optimal set of medoids for the samples. The quality of the resulting medoids is measured by the average dissimilarity between the data objects in the complete data set 208, which is defined as a cost function: Cost(M,D). Cost(M,D) may be equal to the sum of dissimilarities between the data objects in the data set, divided by the number of objects in the data set. The sum may be from i=1 to number of data objects in the data set of dissimilarity $(O_i, rep(M, O_i))$. M is the selected medoids from the sampled data objects. The function dissimilarity $(O_i, O_j)$ is the dissimilarity between objects $O_i$ and $O_j$. The function $rep(M, O_i)$ returns a medoid in M which is closest to $O_i$. To alleviate sampling bias, CLARA repeats the sampling and clustering process for a predefined number of times q and subsequently selects the final clustering result for the set of medoids with the minimal cost. It is noted that the definition of the cost function in may be based on any measurement (e.g. the Euclidean distance or Manhattan distance for the data objects).

In one embodiment, the clustering results from each worker thread 210A-210M may be evaluated by a cluster score thread 212A-212M, and the cluster score generated by the cluster score thread 212A-212M may be returned to the master node 202 with the cluster results (e.g. an indication of which data elements are within each cluster). The master node 202 may evaluate the scores and select an "optimal" group number from the results (e.g. the best result of the available results based on the cost function described above). Optimal cluster number evaluation/determination is illustrated as optimal cluster number thread 214 in FIG. 2.

In one embodiment, the master thread 206 may invoke the worker threads using the fork-exec technique supported by various UNIX®-like operating systems such as Linux and the Mac operating system. The master thread 206 may invoke the system call fork( ) to create the child threads (work threads 210A-210M) and push them to the worker nodes 204A-204M with a different group number for each child. In another embodiment, Apache Spark (or a similar data processing platform, referred to as a Hadoop) may be used. The set of initial group numbers may be converted to a distributed data set (e.g. a resilient distributed data set, or RDD). Apache Spark takes the number of worker nodes as a number of RDD partitions and launches the algorithm on each worker node 204A-204N.

FIG. 3 is an example illustrating one embodiment of the CLARA technique 200, in pseudocode form. The minimum cost variable min_cost is set to a "large number" (e.g. a number that will exceed the cost generated by the cost function Cost(M,D), for most values of M and D). A number of iterations q of the remaining code may be performed, where q is a programmable parameter and may be selected heuristically or based on historical results to a value that frequently provides a good statistical correlation of the samples to the entire data set D. At each iteration, a set S may be created by randomly sampling (drawing) s objects from the data set D, and a set of medoids M is generated from S. The clustering set C is then formed by assigning each object in D to the closest medoid in M. The cost function Cost(M,D) may be applied, and compared to the minimum cost variable min_cost. If the cost function is less than the minimum cost, the minimum cost variable min_cost is set equal to the cost function result, the group medoids variable best_medoids is set to M, and the object grouping variable best_set variable is updated to the set C. When the number of iterations is complete, the best_set and best_medoids are returned as the results of the Clara technique.

The cluster score threads 212A-212M may apply any scoring metric to the clustering results from the worker threads 210A-210M. Generally, the scoring metric may be defined according to a heuristic, providing a bounded metric which indicates an intuitive sense of clustering performance. That is, a score nearer the high bound of the metric may indicate better cluster performance than a scorer nearer the lower bound. In one embodiment, a silhouette coefficient may be used as the scoring metric. The silhouette coefficient contrasts the average distance to samples in the same clustering group with the average distance to samples in other clusters.

The calculation of the silhouette coefficient may be summarized as follows, for one embodiment. Assuming the given data set has been clustered via any technique, for each sample, calculate two scores a and b. Score a is the average distance between a sample and the other points in the same group. Score b is the average distance between a sample and the other points in the next nearest group. The silhouette coefficient s may be calculated as the difference of b and a (b−a) divided by the maximum of a and b. From this definition, the score of the silhouette coefficient is bounded between −1 and +1. Because a is a measure of how dissimilar the sample is to its own group, a small value indicates that it is well assigned. On the other hand, a large b may imply that the sample is badly matched with its neighboring group (e.g. the sample is better as a member of its current group than the neighboring group). Thus, a silhouette coefficient close to 1 may indicate that the sample is appropriately clustered. If it is close to −1, the sample may be more appropriately assigned to its neighboring group. In addition, a score around zero may indicate that the sample is on the border of two groups. Accordingly, a higher silhouette coefficient may indicate better clustering performance. Therefore, the group number associated with the highest silhouette coefficient may be identified as the optimal group number.

Figure 4:
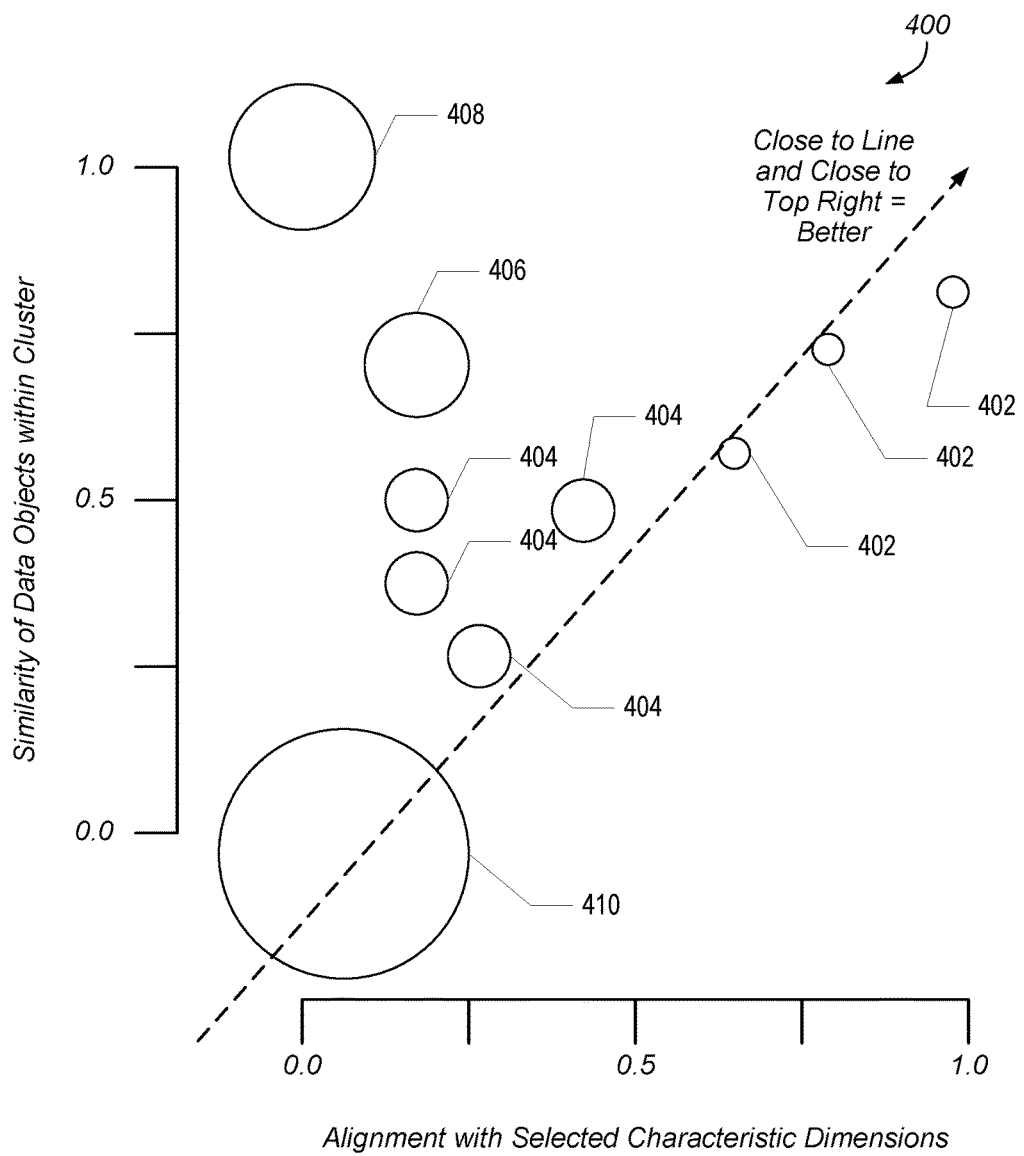
FIG. 4 illustrates an example of a visualization of a clustering result, according to some embodiments.

FIG. 4 is a block diagram 400 illustrating visualization of the clustering result for human viewing and analysis, for an embodiment. The embodiment illustrated in FIG. 4 may reduce the O-dimensional data object clustering (where O is the number of characteristics over which the clustering is performed) to a two dimensional visualization that is more intuitive for a human. One dimension (the vertical dimension, in FIG. 4) may be a normalized indication of the similarity of the data objects within a cluster. The normalized results may be between zero, indicating low similarity (e.g. no similarity), and 1 indicating high similarity (e.g. equality). The horizontal axis may indicate alignment of the clustered objects with a selected set of one or more characteristics and the values of those characteristics (again, normalized from zero to one in this embodiment with zero indicating no alignment and one indicating complete alignment). For example, if the data objects are customer data, a possible set of characteristics may be characteristics (and values of those characteristics) that have been correlated to a propensity to buy a particular product. The set of characteristics that are selected for the horizontal axis may be a subset of the characteristics which are favored in the clustering, a non-overlapping subset of the clustering characteristics, or a partially overlapping subset. Alternatively, clustering may be performed over all n characteristic dimensions of the data objects (equally or weighted).

The illustrated visualization plots the clustering groups based on a tuple of group centroid and group size. The centroid is the center of the samples and the group size is the population of customer samples. In many cases, the data objects may be represented by a number of characteristics, which lead to the group centroids in a high dimensional space. The visualization may be done by transferring the group centroids from high dimensional space to two dimensional space at the first step and then plotting each centroid as a spot with the size component indicating the size of the spot.

For example, in the illustrated embodiment, five cluster sizes are illustrated (although the number of cluster sizes may vary in various embodiments, including more or fewer cluster sizes than the five illustrated sizes). Several tiny clusters 402 are shown, as well as small clusters 404, a median cluster 406, a large cluster 408, and a huge cluster 410. The number of data objects in a cluster for each of the cluster sizes may be dependent on the total data set size and may vary from embodiment to embodiment. For example, tiny clusters may have less than 1,000 data objects; small clusters may have 1,000 to 5,000 data objects; median clusters may have 5,000 to 10,000 data objects; large clusters may have 10,000 to 100,000 data objects, and huge clusters may have more than 100,000 data objects.

In one implementation, multidimensional scaling (MDS) may be used to transfer group centroids from high dimensional space to two dimensional space. MDS is an approach that maps the original high dimensional space to a lower dimensional space, but does preserve pair-wise distances. This may be a good characterization for clustering result illustration to keep the actual space relationship over groups. Given group centroids in high t dimensional space, a txt symmetric distance matrix may be calculated. MDS may attempt to find t data points in the low dimensional space (e.g. two dimensional space in this case) such that the distance between centroids in the low dimensional space is similar to the distance between centroids in the high dimensional space. That is, the MDS may attempt to minimize the difference between the distances over the t data points. In an embodiment, the minimization may be based on singular value decomposition (SVD).

In FIG. 4, there is a dashed line from the lower left to the upper right of the figure. The nearer that a cluster falls to this line, the better that the cluster may be at identifying desired characteristics in the data objects. Thus, for example, the user may select one of the clusters from the visualization of FIG. 4 (which may be projected on a display of a computer system for the user), and the data objects from that cluster may be available for download or other use by the user.

Figure 5:
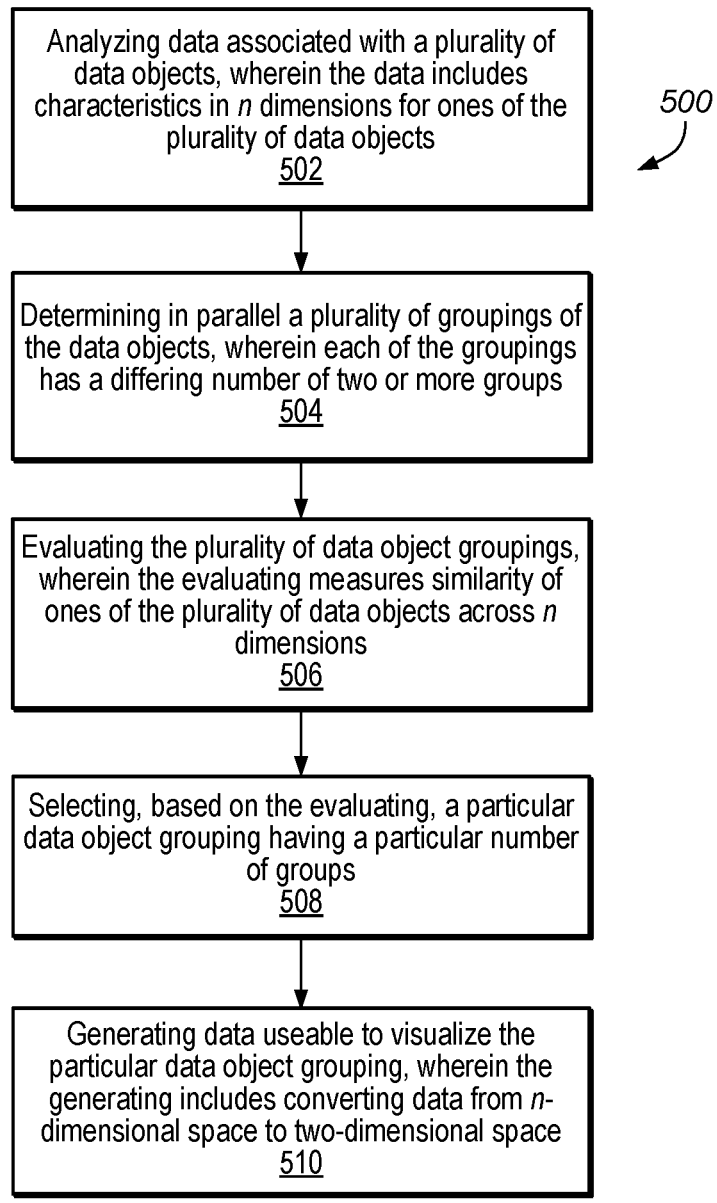
FIG. 5 is a process flow, according to some embodiments.

FIG. 5 is a flowchart 500 illustrating one embodiment of certain techniques described herein. While the blocks are shown in a particular order for ease of understanding, other orders may be used. Blocks, combinations of blocks, and/or the flowchart 500 as a whole may be performed in parallel.

Data associated with the data objects in a data set may be analyzed, where the data includes characteristics in n dimensions for the data objects (block 502). In parallel, a plurality of groupings of the data objects may be determined, where each of the plurality of groupings has a differing number of groups (i.e. a differing group number) (block 504). The groupings may be clusters, as discussed above, based on any clustering technique. The plurality of groupings may be evaluated, measuring the similarity of the plurality of data objects in the groupings over n dimensions (block 506). For example, a score may be generated for each grouping (e.g. a silhouette coefficient, in an embodiment), and the scores for the groupings may be compared. Based on the evaluation, a particular data object grouping having a particular number of groups may be selected (block 508). For example, the grouping having the highest score may be selected. Data to visualize the particular data object grouping may be generated (block 510). For example, clusters may be visualized using MDS to reduce the n dimensional space to two dimensions.

Figure 6:
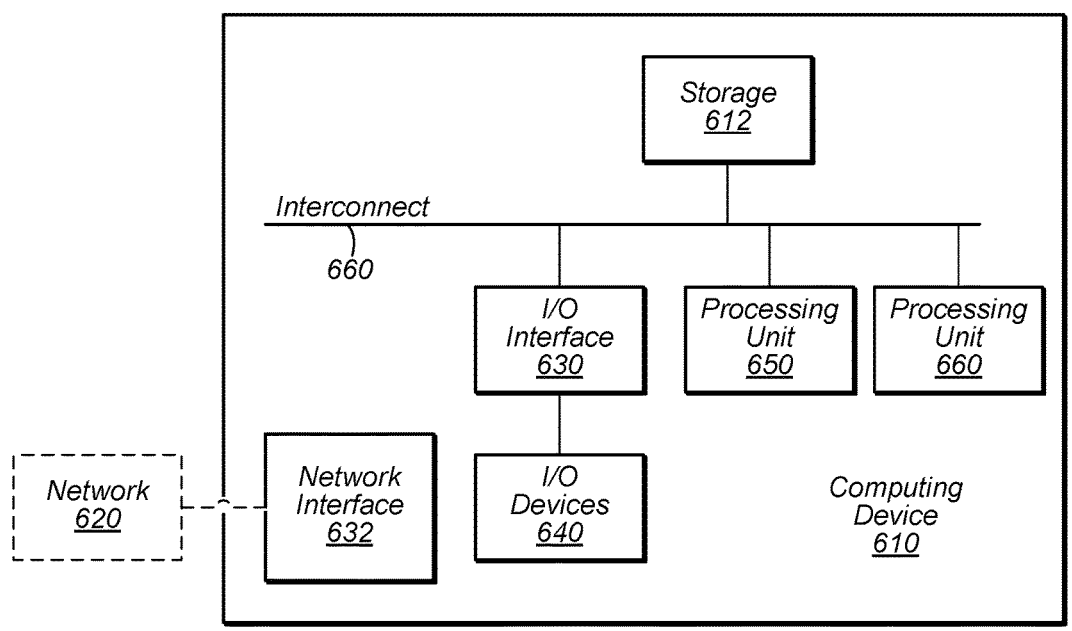
FIG. 6 is a block diagram illustrating a computing system, according to some embodiments.

Turning now to FIG. 6, a block diagram of a computing device (which may also be referred to as a computing system) 610 is depicted, according to some embodiments. Computing device 610 may be used to implement various portions of this disclosure. Computing device 610 is one example of a device that may be used as a mobile device, a server computing system, or any other computing system implementing portions of this disclosure.

Computing device 610 may be any suitable type of device, including, but not limited to, a personal computer system, desktop computer, laptop or notebook computer, mobile phone, mainframe computer system, web server, workstation, or network computer. As shown, computing device 610 includes processing unit 650, storage subsystem 612, input/output (I/O) interface 630 coupled via interconnect 660 (e.g., a system bus). I/O interface 630 may be coupled to one or more I/O devices 640. Computing device 610 further includes network interface 632, which may be coupled to network 620 for communications with, for example, other computing devices.

As described above, processing unit 650 includes one or more processors such as the processor 120 in FIG. 1 and/or the processor cores 122A-122N in FIG. 1. In some embodiments, processing unit 650 includes one or more coprocessor units. In some embodiments, multiple instances of processing unit 650 may be coupled to interconnect 660. Processing unit 650 (or each processor within processing unit 650) may contain a cache or other form of on-board memory. In some embodiments, processing unit 650 may be implemented as a general-purpose processing unit, and in other embodiments it may be implemented as a special purpose processing unit (e.g., an ASIC). In general, computing device 610 is not limited to any particular type of processing unit or processor subsystem.

As used herein, the terms "processing unit" or "processing element" refer to circuitry configured to perform operations or to a memory having program instructions stored therein that are executable by one or more processors to perform operations. Accordingly, a processing unit may be implemented as a hardware circuit implemented in a variety of ways. The hardware circuit may include, for example, custom very-large-scale integration (VLSI) circuits or gate arrays, off-the-shelf semiconductors such as logic chips, transistors, or other discrete components. A processing unit may also be implemented in programmable hardware devices such as field programmable gate arrays, programmable array logic, programmable logic devices, or the like. A processing unit may also be configured to execute program instructions or computer instructions from any suitable form of non-transitory computer-readable media to perform specified operations.

Storage subsystem 612 is usable by processing unit 650 (e.g., to store instructions executable by and data used by processing unit 650). Storage subsystem 612 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage subsystem 612 may consist solely of volatile memory in some embodiments. Storage subsystem 612 may store program instructions executable by computing device 610 using processing unit 650, including program instructions executable to cause computing device 610 to implement the various techniques disclosed herein.

I/O interface 630 may represent one or more interfaces and may be any of various types of interfaces configured to couple to and communicate with other devices, according to various embodiments. In some embodiments, I/O interface 630 is a bridge chip from a front-side to one or more back-side buses. I/O interface 630 may be coupled to one or more I/O devices 640 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"Based On." As used herein, this term is used to describe one or more factors that affect a determination. This term does not foreclose additional factors that may affect a determination. That is, a determination may be solely based on those factors or based only in part on those factors. Consider the phrase "determine A based on B." This phrase connotes that B is a factor that affects the determination of A, but it does not foreclose the determination of A from also being based on C. In other instances, A may be determined based solely on B.

Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component.

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a," "an," and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Although specific embodiments have been described above, these embodiments are not intended to limit the scope of the present disclosure (even where only a single embodiment is described with respect to a particular feature). Examples of features provided in the disclosure are intended to be illustrative rather than restrictive unless stated otherwise. The above description is intended to cover such alternatives, modifications, and equivalents as would be apparent to a person skilled in the art having the benefit of this disclosure. Although some example embodiments are described as providing various advantages, any particular embodiment according to this disclosure may provide some, all, or even none of such advantages.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
   analyzing, by a computer system with a plurality of processing elements, data associated with a plurality of data objects, wherein the plurality of data objects have characteristics in n dimensions, wherein n is greater than two;
   determining in parallel, by the plurality of processing elements of the computer system, a plurality of groupings of the data objects, wherein each of the groupings is determined by a respective processing element of the plurality of processing elements, and wherein each of the groupings has a differing number of two or more groups, wherein the differing number is determined by a group number assigned to the respective processing element prior to determining the plurality of groupings, and wherein each group within one of the plurality of groupings includes data associated with at least one of the plurality of data objects;
   evaluating, by the computer system, the plurality of groupings, wherein the evaluating measures similarity of ones of the plurality of data objects across n dimensions and is represented by a plurality of metrics generated by the plurality of processing elements using a scoring mechanism, wherein each metric of the plurality of metrics corresponds to a respective grouping of the plurality of groupings, and the metric comprises a silhouette coefficient for a given data object in a given group within the respective grouping that is calculated as $(b-a)/\max(a, b)$ where a is an average distance between the given data object and other data objects in the given group and b is the average distance between the given data object and data objects within a nearest neighbor group to the given group;
   selecting, by the computer system based on the evaluating, a particular grouping having a particular number of groups and a corresponding metric, wherein the corresponding metric is higher than other ones of the plurality of metrics corresponding to other ones of the plurality of groupings;
   generating, by the computer system, data useable to visualize the particular grouping, wherein the generating includes converting data from n-dimensional space to two-dimensional space using multi-dimensional scaling to transfer group centroids in the n-dimensional space to two dimensional group centroids while preserving distances between the group centroids; and
   causing the data useable to visualize the particular grouping to be displayed to a user.

2. The method of claim 1, wherein the determining in parallel includes the computer system launching a separate clustering thread for each of the plurality of groupings and distributing the threads to the plurality of processing elements.

3. The method of claim 1, wherein the converting data from n-dimensional space to two-dimensional space determines centroids, for each data object group in the particular grouping in two-dimensional space, in two-dimensional space that are similar to centroids in n-dimensional space.

4. A system, comprising:
   a plurality of processing elements; and
   a memory coupled to the plurality of processing elements, wherein the memory has computer instructions stored thereon that are capable of being executed by the system to cause operations comprising:
   analyzing data associated with a plurality of data objects, wherein the plurality of data objects have characteristics in n dimensions, wherein n is greater than two;
   determining in parallel a plurality of groupings of the data objects, wherein each of the groupings is determined by a respective processing element of the plurality of processing elements, and wherein each of the groupings has a differing number of two or more groups, wherein the differing number is determined by a group number assigned to the respective processing element prior to determining the plurality of groupings, and wherein each group within one of the plurality of groupings includes data associated with at least one of the plurality of data objects;
   evaluating the plurality of groupings, wherein the evaluating measures similarity of ones of the plurality of data objects across n dimensions and is represented by a plurality of metrics generated by the plurality of processing elements using a scoring mechanism, wherein each metric of the plurality of metrics corresponds to a respective grouping of the plurality of groupings, and the metric comprises a silhouette coefficient for a given data object in a given group within the respective grouping that is calculated as $(b-a)/\max(a, b)$ where a is an average distance between the given data object and other data objects in the given group and b is the average distance between the given data object and data objects within a nearest neighbor group to the given group;

selecting, based on the evaluating, a particular data object grouping having a particular number of groups and a corresponding metric, wherein the corresponding metric is higher than other ones of the plurality of metrics corresponding to other ones of the plurality of groupings;

generating data useable to visualize the particular data object grouping, wherein the generating includes converting data from n-dimensional space to two-dimensional space using multi-dimensional scaling to transfer group centroids in the n-dimensional space to two dimensional group centroids while preserving distances between the group centroids; and causing the data useable to visualize the particular data object grouping to be displayed to a user.

5. The system of claim 4, wherein the converting data from n-dimensional space to two-dimensional space evaluates pair-wise distances between the plurality of data objects.

6. The system of claim 4, wherein the generating the data useable to visualize the particular data object grouping encodes actionable information for the user.

7. The system of claim 4, wherein the data useable to visualize the particular data object grouping includes a plot of group centroids.

8. The system of claim 7, wherein a size of the group centroids is proportional to a number of data objects in a given group.

9. The system of claim 4, wherein the plurality of metrics measure intragroup similarity and intergroup dissimilarity.

10. The system of claim 4, wherein the plurality of data objects includes a list of customers with n characteristics.

11. A non-transitory computer-readable medium having computer instructions stored thereon that are capable of being executed by a computer system to cause operations comprising:

analyzing data associated with a plurality of data objects, wherein the plurality of data objects have characteristics in n dimensions, wherein n is greater than two;

determining in parallel a plurality of groupings of the data objects, wherein each of the groupings is determined by a respective processing element of a plurality of processing elements in the computer system, and wherein each of the groupings has a differing number of two or more groups, wherein the differing number is determined by a group number assigned to the respective processing element prior to determining the plurality of groupings, and wherein each group within one of the plurality of groupings includes data associated with at least one of the plurality of data objects;

evaluating the plurality of groupings, wherein the evaluating measures similarity of ones of the plurality of data objects across n dimensions and is represented by a plurality of metrics generated by the plurality of processing elements using a scoring mechanism, wherein each metric of the plurality of metrics corresponds to a respective grouping of the plurality of groupings, and the metric comprises a silhouette coefficient for a given data object in a given group within the respective grouping that is calculated as (b−a)/max(a, b) where a is an average distance between the given data object and other data objects in the given group and b is the average distance between the given data object and data objects within a nearest neighbor group to the given group;

selecting, based on the evaluating, a particular data object grouping having a particular number of groups and a corresponding metric, wherein the corresponding metric is higher than other ones of the plurality of metrics corresponding to other ones of the plurality of groupings;

generating data useable to visualize the particular data object grouping, wherein the generating includes converting data from n-dimensional space to two-dimensional space using multi-dimensional scaling to transfer group centroids in the n-dimensional space to two dimensional group centroids while preserving distances between the group centroids; and causing the data useable to visualize the particular data object grouping to be displayed to a user.

12. The non-transitory computer-readable medium of claim 11, wherein the determining in parallel includes a master node launching a separate clustering thread for each of the plurality of groupings, wherein each separate clustering thread executes a clustering algorithm with a differing group number.

13. The non-transitory computer-readable medium of claim 12, wherein each of the plurality of metrics is a clustering score and is returned to the master node.

14. The non-transitory computer-readable medium of claim 12, wherein the clustering algorithm is a Clustering Large Applications (CLARA) algorithm.

15. The non-transitory computer-readable medium of claim 11, wherein the determining the plurality of groupings includes determining a number of groupings that is based on an availability of computer resources of the computer system.

* * * * *